United States Patent
Yang et al.

(10) Patent No.: US 7,652,545 B2
(45) Date of Patent: Jan. 26, 2010

(54) SYSTEM AND METHOD OF CALIBRATING REAL TIME CLOCK UTILIZING AVERAGE CALIBRATION

(75) Inventors: Tzung-Shian Yang, Yilan County (TW); Chih-Wei Ko, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 101 days.

(21) Appl. No.: 11/952,146

(22) Filed: Dec. 7, 2007

(65) Prior Publication Data
US 2009/0146744 A1 Jun. 11, 2009

(51) Int. Cl.
*G01K 15/00* (2006.01)
(52) U.S. Cl. .......... 331/158; 368/159
(58) Field of Classification Search .......... 331/158; 368/159
See application file for complete search history.

(56) References Cited

U.S. PATENT DOCUMENTS

| 5,272,650 | A |   | 12/1993 | Adams |
| 5,710,910 | A |   | 1/1998 | Kehl et al. |
| 5,771,180 | A | * | 6/1998 | Culbert ............ 702/130 |

* cited by examiner

*Primary Examiner*—Joseph Chang
(74) *Attorney, Agent, or Firm*—Winston Hsu

(57) ABSTRACT

A system for real time clock (RTC) calibration includes: a timer counter; a clock generator; and a clock calibration unit coupled between the clock generator and the timer counter. The clock calibration unit receives calibration parameters comprising an average calibration value, a remainder calibration value and a calibration period, counts a plurality of clock cycles generated by the clock generator, calibrates a number of the counted clock cycles according to the average calibration value and remainder calibration value in the calibration period, and increments the timer counter by one second when a predetermined number of clock cycles have been reached.

16 Claims, 4 Drawing Sheets

SYSTEM AND METHOD OF CALIBRATING REAL TIME CLOCK UTILIZING AVERAGE CALIBRATION

BACKGROUND

The invention relates to calibrating a real time clock (RTC) and more particularly to a method for calibrating an RTC that utilizes an average method of calibration.

Real Time Clocks (RTC) are essential components of many electrical devices. RTCs utilize crystals for performing timing functions. The crystals oscillate at a predetermined frequency, and a counter is updated by one second after a predetermined number of oscillations. The frequency of oscillations varies with temperature, however, so the precision of the crystals will be affected when environmental conditions change. The quality of the crystals also affects the precision. This means that, in certain situations, the crystals will oscillate faster or slower than expected so the predetermined number of oscillations will not exactly equal one second and the clock timing becomes inaccurate. In these situations, calibration needs to be performed to correct for the timing errors.

If the accumulated offset is relatively large then a significant 'jump' will occur at the point of calibration. This can be distracting to a user.

SUMMARY

It is therefore an objective of the present invention to provide a method for real time clock (RTC) calibration that achieves finer precision than the prior art.

With this in mind, an embodiment of a system for RTC calibration is provided. The system comprises: a timer counter; a clock generator; a calibration parameter refresh unit; and a clock calibration unit coupled between the timer counter, the clock generator and the calibration parameter refresh unit. The calibration parameter refresh unit outputs a first calibration parameter comprising a first calibration period until the final second of the first calibration period is reached, and outputs a second calibration parameter instead of the first calibration parameter when reaching the final second of the first calibration period. The clock calibration unit increments the real time counter according to multiple clock cycles generated by the clock generator, and the first or second calibration parameter provided by the calibration parameter refresh unit.

An embodiment of a system for RTC calibration is also provided. A system for real time clock (RTC) calibration includes: a timer counter; a clock generator; and a clock calibration unit coupled between the clock generator and the timer counter. The clock calibration unit receives calibration parameters comprising an average calibration value, a remainder calibration value and a calibration period, counts a plurality of clock cycles generated by the clock generator, calibrates a number of the counted clock cycles according to the average calibration value and remainder calibration value during the calibration period, and increments the real time counter by one second when a predetermined number of clock cycles have been reached.

An embodiment of a method for RTC calibration is disclosed. The method comprises: providing a first calibration parameter comprising a first calibration period until the final second of the first calibration period is reached; providing a second calibration parameter instead of the first calibration parameter when reaching the final second of the first calibration period; and incrementing a real time counter according to multiple clock cycles generated by a clock generator and the provided first or second calibration parameter. The real time counter is substantially incremented by one second.

An embodiment of a method for RTC calibration is also disclosed. The method comprises: receiving calibration parameters comprising an average calibration value, a remainder calibration value and a calibration period; counting a plurality of clock cycles generated by a clock generator; calibrating the counted clock cycles according to the average calibration value and remainder calibration value during the calibration period; and incrementing a real time counter by one second when a predetermined number of clock cycles have been reached.

These and other objectives of the present invention will no doubt become obvious to those of ordinary skill in the art after reading the following detailed description of the preferred embodiment that is illustrated in the various figures and drawings.

DETAILED DESCRIPTION

The present invention aims to utilize an average effect of calibration rather than performing burst calibration as in the prior art. By constantly correcting over a period of time rather than performing all calibration in one stage, a finer calibration effect can be achieved.

Figure 1:
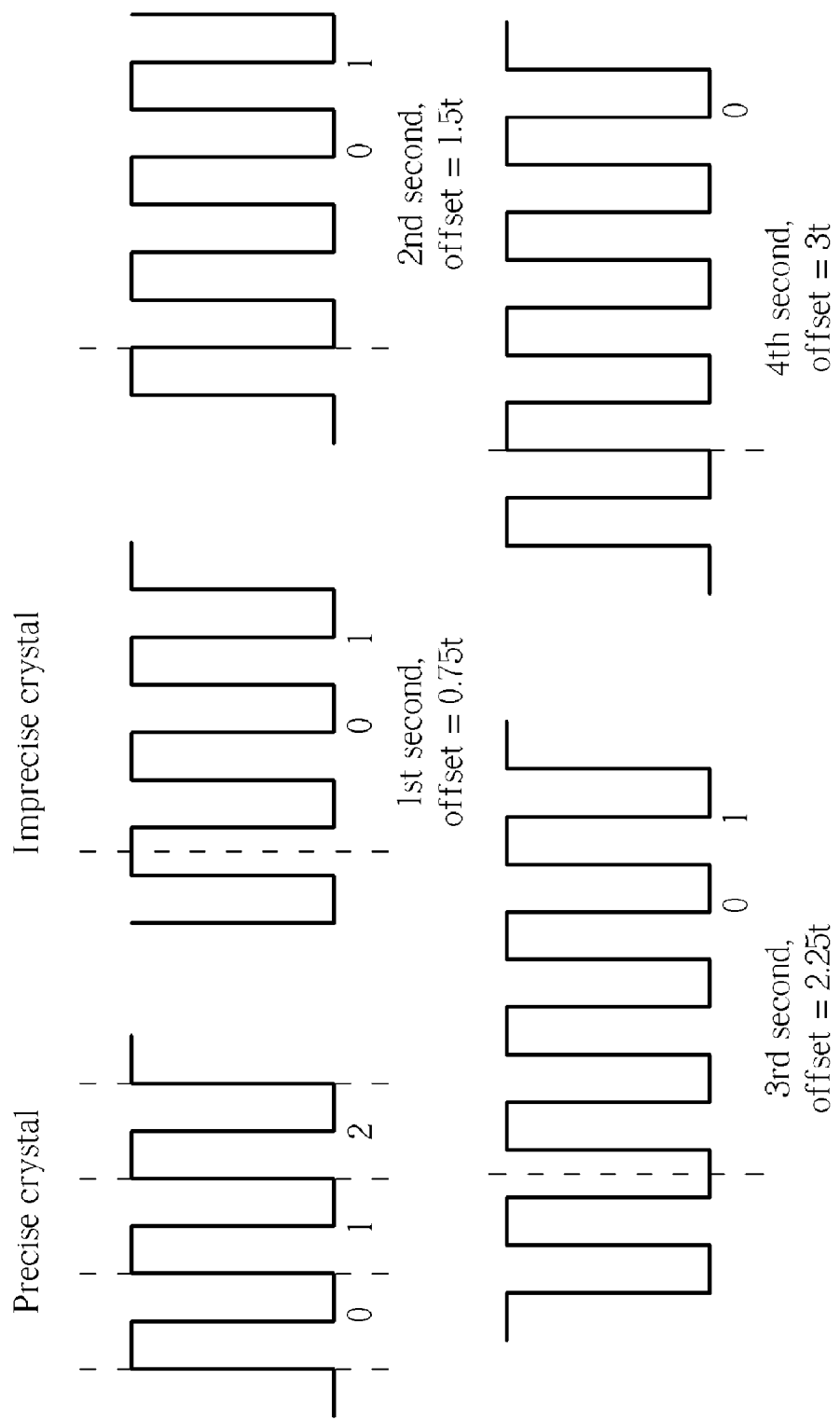
FIG. 1 shows a clock cycle corresponding to oscillations of a crystal.

Typical crystals vibrate 32.768K times per second. When there is an imprecision in the crystals, this number will increase or decrease. The RTC is calibrated through adding or subtracting a number of oscillations to the predetermined number of oscillations. If, for example, the crystal imprecision results in the crystal oscillating an extra X oscillations in a second, the predetermined number of oscillations must similarly be increased by X. As fractions of oscillations cannot be added, the system must wait until the offset/imprecision has accumulated to a whole number of oscillations. Please refer to FIG. 1. FIG. 1 shows a clock cycle corresponding to oscillations of a crystal wherein imprecision in the crystal results in the cycle being out by ¾ of a cycle, or 0.75 t. As a system can only calibrate whole numbers of oscillations, the system must wait for four seconds until the offset has accumulated to a whole number, i.e. 3 cycles (3 t), and then the total offset can be calibrated at that point. This is referred to as 'burst' calibration.

Figure 2:
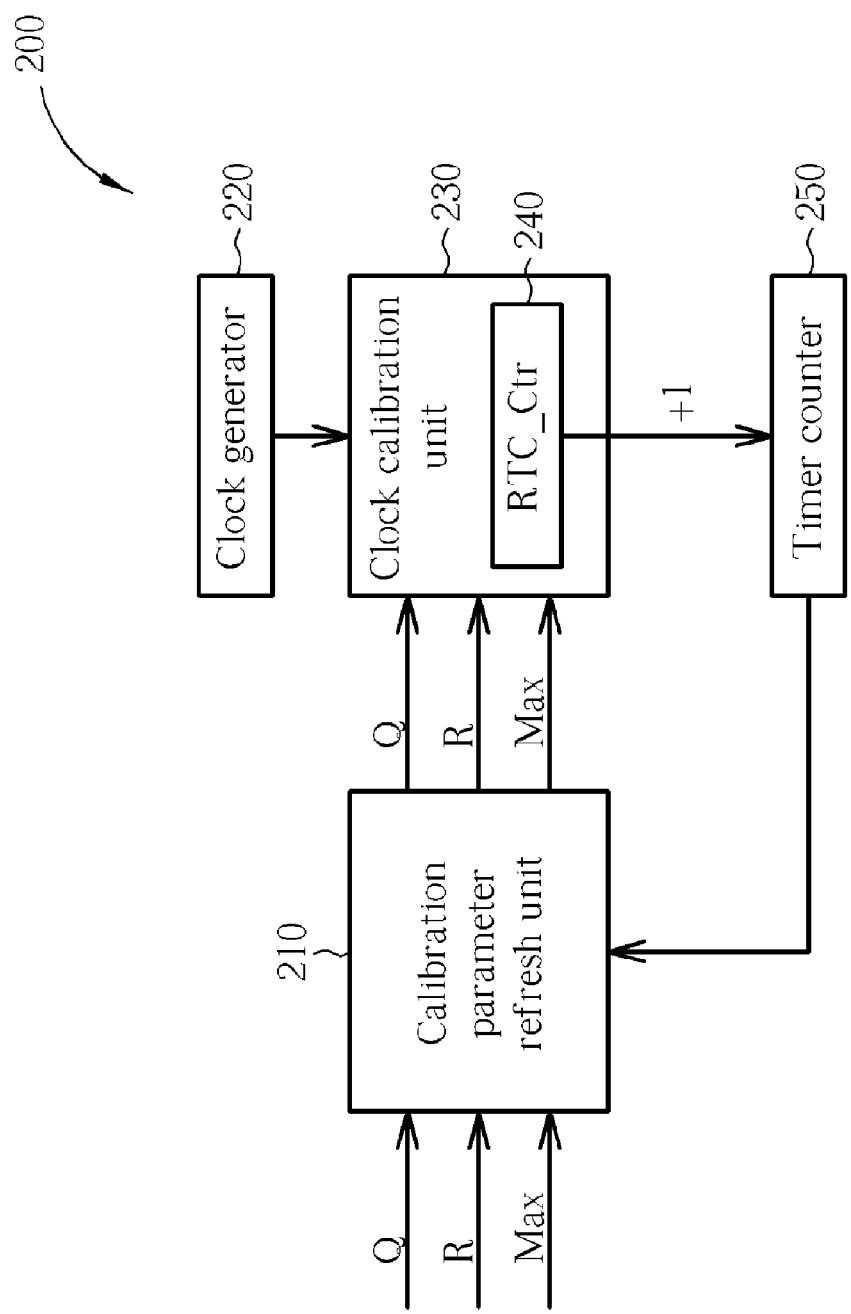
FIG. 2 is a diagram of an RTC calibration system according to an exemplary embodiment of the present invention.

Please refer to FIG. 2. FIG. 2 is a diagram of an RTC calibration system 200 according to an exemplary embodiment of the present invention. The RTC calibration system 200 comprises a clock generator 220, which generates a plurality of clock cycles corresponding to oscillations of the RTC crystal. A clock calibration unit 230 is coupled to the clock generator 220. The clock calibration unit 230 comprises an RTC counter 240, which counts a number of clock cycles and then generates a signal when a predetermined number of clock cycles has been reached. This signal is sent to a timer counter 250, and is for instructing the timer counter 250 to update the time it shows by one second. The clock calibration unit 230 will calibrate (adjust) a number of clock cycles counted by the RTC counter 240 in order to make the number more accurate.

A calibration parameter refresh unit 210 is coupled to the clock calibration unit 230 and the timer counter 250. The present invention sets a calibration period for a calibration period to occur, which is equal to a plurality of seconds. When the calibration period is completed, the calibration parameter refresh unit 210 will update calibration values and the calibration period input to the clock calibration unit 230.

An embodiment of a method of the present invention will be explained in the following. In this example, the amount of clock cycles that need to be added to the predetermined number of clock cycles is 19. The conventional method would calibrate all 19 clock cycles in one burst but an embodiment of the method of the present invention utilizes the total number of clock cycles to be calibrated, and a determined calibration period length to calculate an average calibration value that can be utilized to calibrate the RTC counter 240 every second of the determined calibration period, and a remainder calibration value that can be utilized to calibrate the RTC counter 240 in the final second of the determined calibration period, thereby reducing the amount of distortion visible to a user. In this example the determined calibration period length is 8 seconds. It should be noted that the determination of the calibration period is designed to give the most precise calibration result. As the division of the amount of clock cycles to be calibrated by the determined calibration period will not give a whole number, the present invention determines an average factor Q and a remainder factor R, wherein the RTC counter 240 will be calibrated by Q+R in the final second of the calibration period. In this example, Q=2 and R=3. It is to be understood that the Q or R may be set to a negative integer. Therefore, from time t0~t6, the system 200 will add Q clock cycles (2) every second to a number of clock cycles originally generated by the clock generator 220 by calibrating the RTC counter 240, and will add Q+R clock cycles (2+3), i.e. 5 clock cycles to a number of clock cycles originally generated by the clock generator 220 by calibrating the RTC counter 240 in the final second of the calibration period. It should be noted that the additional Q and R values have not been actually counted by the RTC counters. Those skilled in the art may realize that addition of Q or Q+R when reaching a specific number of cycle clocks during one second is also allowed, for example, when reaching 100 t, 200 t, 300 t, etc.

Figure 3:
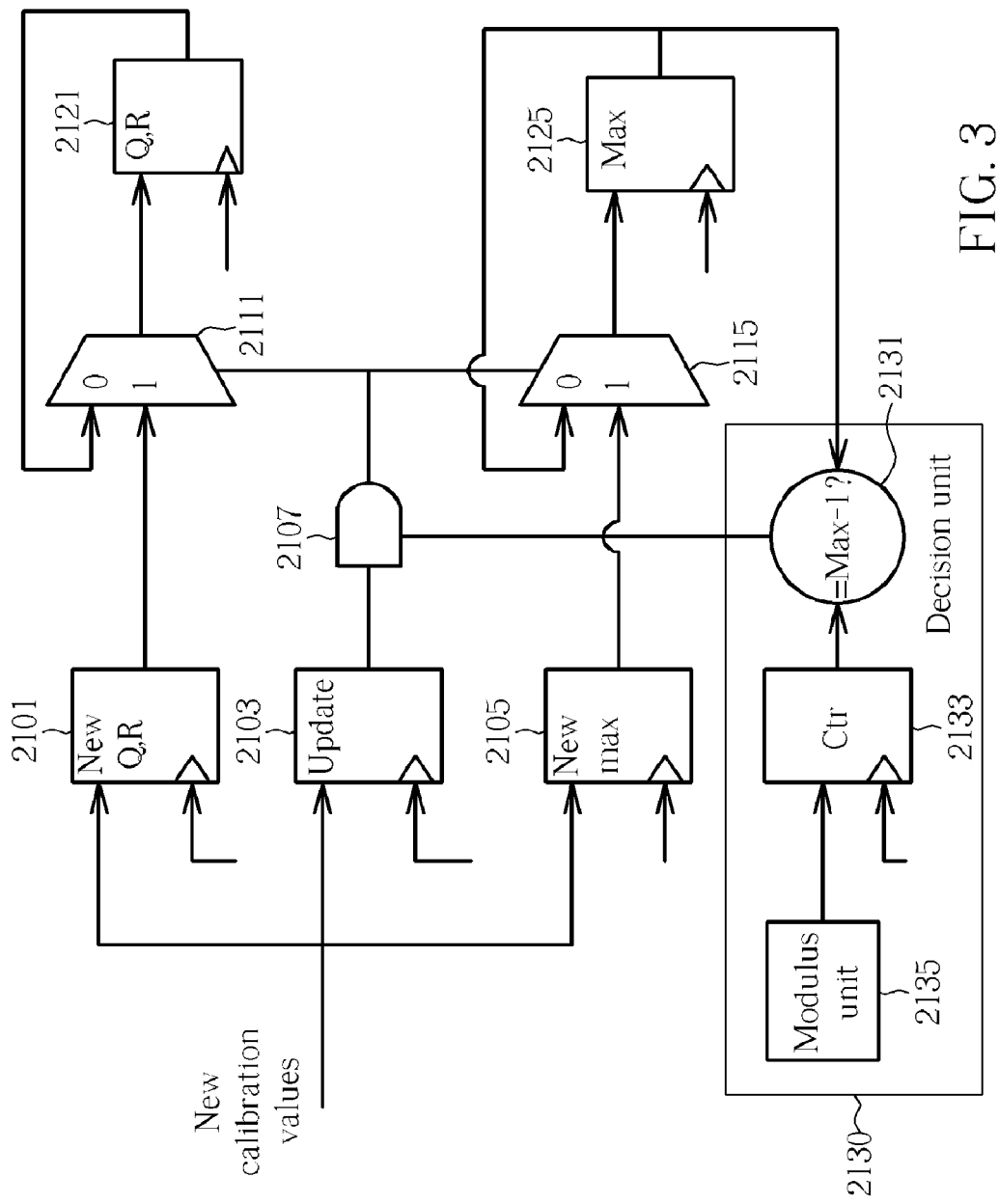
FIG. 3 is a diagram of an exemplary embodiment of a calibration parameter refresh unit shown in FIG. 2.

As well as utilizing the final second of the calibration period to calibrate the RTC counter 240 by Q+R, the final second of the calibration period is also utilized to update the average and remainder calibration values. Please refer to FIG. 3. FIG. 3 is a diagram of the calibration parameter refresh unit 210 shown in FIG. 2. The calibration parameter refresh unit 210 comprises a value storage unit 2121 and a period storage unit 2125, the value storage unit 2121 for storing calibration values of Q and R, and the period storage unit 2125 for storing the calibration period Max. The stored Q, R and Max are provided to the clock calibration unit 230 for calibration as shown in FIG. 2, and are referred to as calibration parameters. New calibration values Q', R' and calibration period Max' are inputted to a new value storage unit 2101 and a new period storage unit 2105. The new value storage unit 2101 is coupled to a first multiplexer 2111, the output of the first multiplexer 2111 coupled to the value storage unit 2121, wherein the output of the value storage unit 2121 also serves as an input of the first multiplexer 2111. Similarly, the new period storage unit 2105 is coupled to a second multiplexer 2115, the output of the second multiplexer 2115 being coupled to the period storage unit 2125, wherein the output of the period storage unit 2125 also serves as an input of the second multiplexer 2125. The output of the period storage unit 2125 is also input to a decision unit 2130, wherein the output of the decision unit 2130 is an input of an AND gate 2107. The other input of the AND gate 2107 is the output of an update flag storage unit 2103, which receives a positive signal when new calibration values and time period are determined. The output of the AND gate 2107 serves as the selection signal of the first and second multiplexers 2111, 2115. Therefore, when a positive signal is received from the update flag storage unit 2103, and the decision unit 2130 output is positive, the AND gate 2107 will output a positive selection signal, instructing the first and second multiplexers 2111, 2115 to respectively output the new calibration values Q' and R', and the new calibration time period Max'. The new calibration values Q' and R', and the new calibration time period Max' are refreshed and provided to the clock calibration unit 230 as shown in FIG. 2 when a positive signal is received from the update flag storage unit 2103, and the decision unit 2130 output is positive. It should be understood that only refreshing one or two parameters out of Q', R' and Max' at one time is also allowable. When the current calibration period has not reached a maximum value, the first and second multiplexers 2111, 2115 will continue to output the original calibration values Q and R and the original calibration period Max. One or more of the value storage unit 2121, period storage unit 2125, new value storage unit 2101, new period storage unit 2105 and update flag storage unit 2103 may be implemented by flip-flops.

The decision unit 2130 comprises a comparison unit 2131, for comparing a number of seconds with a calibration$_{max}$-1 value, wherein if the two values are equal then a positive signal will be sent to the AND gate 2107. If the number of seconds equals the calibration$_{max}$-1 value then this indicates that the final second of the calibration period is reached. The comparison unit 2131 is coupled to a counter storage unit 2133, which is coupled to a modulus unit 2135 for performing a modulus calculation on a counter value each time the counter value is increased by one. It is to be understood that the counter value is received from the timer counter 250 as shown in FIG. 2.

The multiplexers 2111 and 2115, AND gate 2107, decision unit 2131 and the update flag storage unit 2103 may be referred to as a parameter update unit. The parameter update unit is employed to update the stored Q, R and/or Max with new Q', R' and/or Max' when the counter value stored in the counter storage unit 2133 reaches the final second of the first calibration period, and new Q', R' and/or Max' will be stored in the new value storage unit 2101 and new period storage unit 2105.

Please refer to FIG. 2 again. In the clock calibration unit 230 or the calibration parameter refresh unit 210, the average and remainder calibration values Q/Q' and R/R' can be represented by an 8-bit value, $X[b_{m-1}:b_0]$ when the calibration period Max/Max' is equal to $2^n$, wherein $b_{m-1}$ represents the most significant bit, and $b_0$ represents the least significant bits. The average value Q/Q', can therefore be determined to be $X[b_{m-1}:b_n]$. It should be understood that $X[b_{m-1}:b_n]$ is a 2's complement value when the Q/Q' represents a negative integer. The remainder value, R/R', is equal to $X[b_{n-1}:b_0]$. For example, when a calibration period is equal to 8 seconds ($2^3$ seconds) the 8-bit value is composed of an average calibration value $X[b_7:b_3]$ and a remainder calibration value $X[b_2:b_0]$. Therefore, in each of the preceding seven seconds of the calibration period, the number of the RTC counter will equal RTC_ctr+$X[b_{m-1}:b_n]$, and in the final second of the calibration period the predetermined value of the RTC counter will equal RTC_ctr+X[$b_{m-1}$:$b_n$]+X[$b_{n-1}$:$b_0$], where RTC_ctr represents a number of actual oscillations in a specific second generated by the clock generator 220.

Figure 4:
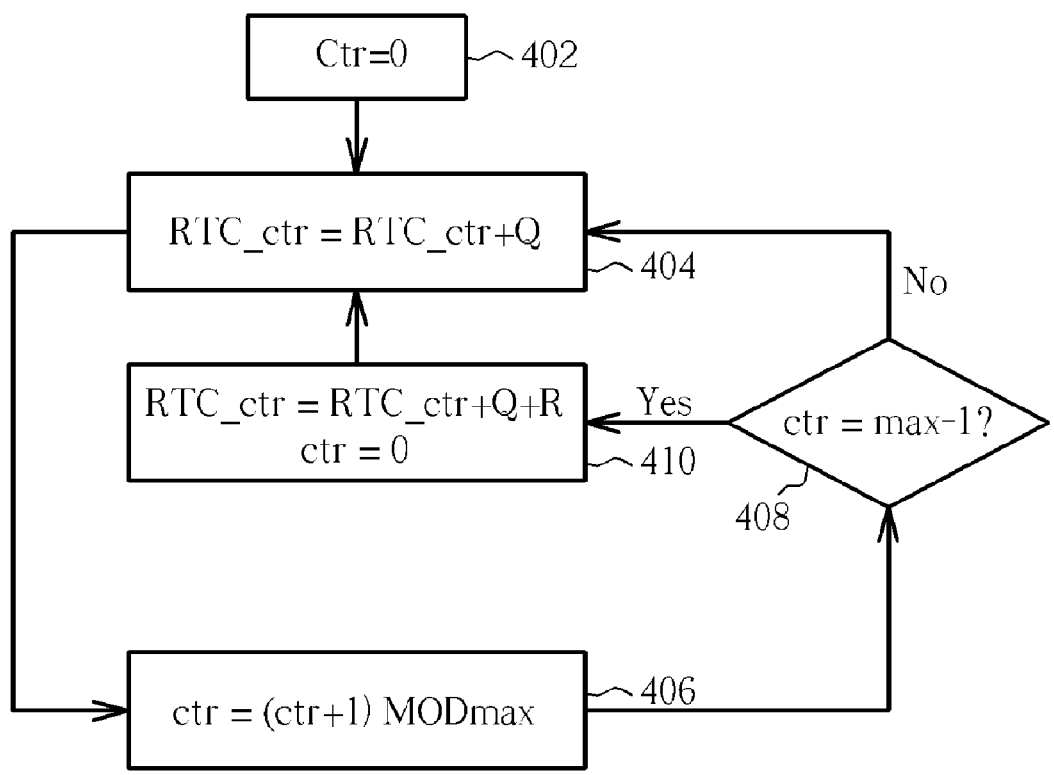
FIG. 4 is a flowchart showing steps of an exemplary embodiment of a method of the present invention.

Please refer to FIG. 4. FIG. 4 is a flowchart showing steps of the method of an exemplary embodiment of the present invention, employed by the clock calibration unit 230 as shown in FIG. 2. The steps are as follows:

Step 402: ctr=0;

Step 404: RTC_ctr=RTC_ctr+Q;

Step 406: ctr=(ctr+1) MOD max;

Step 408: ctr=max−1? If yes go to Step 410; if no go back to Step 404;

Step 410: RTC_ctr=RTC_ctr+Q+R; ctr=0.

Initially the counter=0 (Step 402). New calibration values are received, and the RTC counter is updated by Q in a first second of the calibration period (Step 404). The counter is then updated by one (Step 406), and a comparison is performed to determine whether a current second of the calibration period is the final second of the calibration period (Step 408). If no, then the flow returns to Step 404 and the RTC counter is again updated by Q, and the counter is updated by one in Step 406. If the comparison result determines that the current second of the calibration period is the final second of the calibration period then the flow will go to Step 410 where the RTC counter is updated by Q+R.

Exemplary execution details for the above-mentioned flowchart are further described below. Once calibration parameters are changed, in the first second of a calibration period, steps 402 and 404 are performed in turn to update the RTC counter by Q. In a second other than the first and last seconds of the calibration period, steps 406, 408 and 404 are sequentially performed to update the RTC counter by Q. In the last second of the calibration period, steps 406, 408 and 410 are sequentially performed to update the RTC counter by Q and R. After the last second of the calibration period, a next calibration period starts. When calibration parameters are not changed, in the first second of the next calibration period, Step 404 is performed to update the RTC counter by Q. The calibration for subsequent seconds of the next calibration period can be deduced by the analogy.

As calibration can be performed continuously, rather than in a burst, a smoother transition between an incorrect time and a correct time is achieved. A current calibration period can also be utilized as a marker to determine when to update a new calibration value to the clock calibration unit 230.

Those skilled in the art will readily observe that numerous modifications and alterations of the device and method may be made while retaining the teachings of the invention.

What is claimed is:

1. A system for real time clock (RTC) calibration, the system comprising:
    a timer counter;
    a clock generator;
    a calibration parameter refresh unit, for outputting a first calibration parameter comprising a first calibration period, a first average calibration value and a first remainder calibration value until the final second of the first calibration period is reached, and outputting a second calibration parameter instead of the first calibration parameter when reaching the final second of the first calibration period; and
    a clock calibration unit, coupled between the timer counter, the clock generator and the calibration parameter refresh unit, for incrementing the timer counter according to a plurality of clock cycles generated by the clock generator, and the first or second calibration parameter provided by the calibration parameter refresh unit,
    wherein the clock calibration unit calibrates counting of the clock cycles generated by the clock generator by the first average calibration value in a second other than the final second of the first calibration period, and calibrates counting of the clock cycles generated by the clock generator by the first average calibration value and the first remainder calibration value in the final second of the first calibration period, the first average calibration value and the first remainder calibration value are determined by a total number of clock cycles to be calibrated and the first calibration period.

2. The system of claim 1, wherein the calibration parameter refresh unit further comprises:
    a first period storage unit, for receiving, storing and outputting the first calibration period;
    a first value storage unit, for receiving, storing and outputting the first average calibration value of the first calibration parameter, or the first remainder calibration value of the first calibration parameter; and
    a parameter update unit, coupled to inputs of the first period storage unit and the first value storage unit, for updating the first average calibration value and the first remainder calibration value stored in the first value storage unit with a second average calibration value and a second remainder calibration value, respectively, of the second calibration parameter when determining that a counter value of the timer counter reaches the final second of the first calibration period, and detecting that the second average calibration value and the second remainder calibration value are provided,
    wherein the counter value corresponds to a current value updated by the timer counter, the second average calibration value and the second remainder calibration value are determined by the total number of clock cycles to be calibrated and a second calibration period.

3. The system of claim 2, wherein the parameter update unit further comprises:
    a first multiplexer, coupled between outputs of the second average calibration value and the second remainder calibration value, and the input and output of the first value storage unit, for selectively outputting the first average calibration value with the first remainder calibration value and the second average calibration value with the second remainder calibration value to the first value storage unit according to a selection signal; and
    a second multiplexer, coupled between an output of the second calibration period and the input and output of the first period storage unit, for selectively outputting the first calibration period and the second calibration period to the first period storage unit according to the selection signal.

4. The system of claim 3, wherein the second average calibration value and the second remainder calibration value are received from a second value storage unit, and the second calibration period is received from a second period storage unit.

5. The system of claim 3, wherein the parameter update unit further comprises:
    a decision unit, coupled between the output of the first period storage unit and an input of the timer counter, for outputting a positive signal when the counter value reaches the final second of the first calibration period according to the output of the first period storage unit and the input of the timer counter;

an update flag storage unit, for outputting a positive signal when the second average calibration value and the second remainder calibration value are provided; and an AND gate, coupled between the output of the update flag storage unit and the output of the decision unit, for outputting the selection signal to direct the first multiplexer to output the second average calibration value with the second remainder calibration value to the first value storage unit, and direct the second multiplexer to output the second calibration period to the second period storage unit when detecting the positive signals from the update flag storage unit and decision unit.

6. The system of claim 5, wherein the decision unit comprises:

a calculation unit, for determining the modulus of the updated counter value;

a counter storage unit, for storing the modulus of the updated counter value; and a comparison unit, coupled to the counter storage unit, the output of the first period storage unit, and the input of the AND gate, for comparing the modulus of the updated counter value with the first calibration period output from the first period storage unit, and for sending the positive signal to the AND gate when the modulus of the updated counter value equals the first calibration period minus one.

7. A method for real time clock (RTC) calibration, the method comprising:

providing a first calibration parameter comprising a first calibration period, a first average calibration value and a first remainder calibration value until the final second of the first calibration period is reached;

providing a second calibration parameter instead of the first calibration parameter when reaching the final second of the first calibration period;

incrementing a real time counter according to a plurality of clock cycles generated by a clock generator and the provided first or second calibration parameter, wherein the real time counter is substantially incremented by one second, counting of the clock cycles generated by the clock generator is calibrated by the first average calibration value in a second other than the final second of the first calibration period, and calibrated by the first average calibration value and the first remainder calibration value in the final second of the first calibration period, the first average calibration value and the first remainder calibration value are determined by a total number of clock cycles to be calibrated and the first calibration period.

8. The method of claim 7, wherein the step of providing the second calibration parameter further comprises:

updating the first average calibration value and the first remainder calibration value with a second average calibration value and a second remainder calibration value of the second calibration parameter when determining that a counter value reaches the final second of the first calibration period, wherein the counter value corresponds to a current value updated by the timer counter, the second average calibration value and the second remainder calibration value are determined by the total number of clock cycles to be calibrated and a second calibration period.

9. The method of claim 8, wherein the step of providing second calibration parameter further comprises:

determining the modulus of the updated counter value;

comparing the modulus of the updated counter value with the first calibration period; and determining that the counter value reaches the final second of the first calibration period when the modulus of the updated counter value equals the first calibration period minus one.

10. A system for real time clock (RTC) calibration, the system comprising:

a timer counter;

a clock generator; and a clock calibration unit, coupled between the clock generator and the timer counter, for receiving calibration parameters comprising an average calibration value, a remainder calibration value and a calibration period, counting a plurality of clock cycles generated by the clock generator, calibrating a number of the counted clock cycles according to the average calibration value and remainder calibration value during the calibration period, and incrementing the real time counter by one second when a predetermined number of clock cycles have been reached, wherein the clock calibration unit further calibrates the number of the counted clock cycles to additionally increase or decrease the number of the counted clock cycles by the average calibration value in a second other than the final second of the calibration period, and calibrates the number of the counted clock cycles to additionally increase or decrease the number of the counted clock cycles by the average calibration value and the remainder calibration value in the final second of the calibration period, the average calibration value and the remainder calibration value are determined by a total number of clock cycles to be calibrated and the calibration period.

11. The system of claim 10, wherein the clock calibration unit comprises:

an RTC counter, for counting the clock cycles generated by the clock generator, and sending a signal to the timer counter to increment the timer counter by one second when the predetermined number of calibrated clock cycles have been counted.

12. The system of claim 10, wherein the average calibration value and the remainder calibration value are represented by an in-bit value, the calibration period equals $2^n$, m>0, and n>0.

13. The system of claim 12, wherein X denotes the m-bit value, $b_{m-1}$ represents the most significant bit, $b_0$ represents the least significant bits, $X[b_{m-1}:b_n]$ denotes the average value, and $X[b_{n-1}:b_0]$ denotes the remainder value.

14. A method for real time clock (RTC) calibration, the method comprising:

receiving calibration parameters comprising an average calibration value, a remainder calibration value and a calibration period;

counting a plurality of clock cycles generated by a clock generator;

calibrating the counted clock cycles according to the average calibration value and remainder calibration value during the calibration period; and incrementing a timer counter by one second when a predetermined number of clock cycles have been reached, wherein the calibration step further comprises: additionally increasing or decreasing the number of counted clock cycles by the average calibration value in a second other than the final second of the calibration period, and additionally increasing or decreasing the number of counted clock cycles by the average calibration value and the remainder calibration value in the final second of the calibration period, the average calibration value and the remainder calibration value are determined by a total number of clock cycles to be calibrated and the calibration period.

15. The system of claim 14, wherein the average calibration value and the remainder calibration value are represented by an in-bit value, the calibration period equals $2^n$, m>0, and n>0.

16. The system of claim 15, wherein X denotes the in-bit value, $b_{m-1}$ represents the most significant bit, $b_0$ represents the least significant bits, $X[b_{m-1}:b_n]$ denotes the average value, and $X[b_{n-1}:b_0]$ denotes the remainder value.

* * * * *